United States Patent [19]

Yoshikawa et al.

[11] Patent Number: 4,841,154

[45] Date of Patent: Jun. 20, 1989

[54] THERMAL COPYING APPARATUS

[75] Inventors: Masanori Yoshikawa, Mino; Shuichi Watanabe, Yahata, both of Japan

[73] Assignee: Matsushita Electric Industrial Co., Ltd., Kadoma, Japan

[21] Appl. No.: 60,358

[22] Filed: Jun. 10, 1987

[30] Foreign Application Priority Data

Jul. 18, 1986 [JP] Japan ................................ 61-170054
Nov. 10, 1986 [JP] Japan ................................ 61-266890
Nov. 10, 1986 [JP] Japan ................................ 61-266924

[51] Int. Cl.$^4$ ................................................ G03C 5/16
[52] U.S. Cl. .............................. 250/317.1; 250/316.1; 250/319; 346/76 PH
[58] Field of Search .................. 250/316.1, 317.1, 318, 250/319; 346/76 PH; 219/216; 355/3 R, 14 R

[56] References Cited

U.S. PATENT DOCUMENTS

| | | | |
|---|---|---|---|
| 3,195,455 | 7/1965 | Newman | 250/317.1 X |
| 3,224,355 | 12/1965 | Thomiszer | 250/319 X |
| 3,379,526 | 4/1968 | Limberger et al. | 250/318 X |
| 3,414,724 | 12/1968 | Kuarnegard | 250/318 |
| 3,598,993 | 8/1971 | Kaufer | 250/319 |
| 3,628,860 | 12/1971 | Ogawa | 250/317.1 X |
| 4,034,189 | 7/1977 | Sakamaki et al. | 219/216 |
| 4,131,796 | 12/1978 | Kuarnegard | 250/318 X |
| 4,161,644 | 7/1979 | Yanagawa et al. | 250/317.1 X |
| 4,438,321 | 3/1984 | Moraw | 219/216 |
| 4,628,183 | 12/1986 | Satomura | 219/216 |

FOREIGN PATENT DOCUMENTS 45-19819 7/1970 Japan .
53-121637 10/1978 Japan .
55-2082 1/1980 Japan .

Primary Examiner—Eugene R. LaRoche
Assistant Examiner—Seung Ham
Attorney, Agent, or Firm—Wenderoth, Lind & Ponack

[57] ABSTRACT

A thermal copying apparatus disclosed holds an original and a recording sheet in intimate contact with each other between a holding member and a transparent member and operates a light source to irradiate the original through the transparent member thereby to effect a copying operation thermosensitively. The apparatus further has at least one of a heater for heating the transparent member at a portion where the original and the recording sheet are fed into prior to the copying operation, a cooling fan for generating a cooling gas flowing perpendicularly to the conveying direction of the original and the recording sheet and reversing its flowing direction at predetermined cycles, a sensor for detecting temperature of the transparent member, and a circuit for controlling energy of the light source in accordance with the detected temperature, thus being capable of always obtaining uniform copying density.

15 Claims, 5 Drawing Sheets

THERMAL COPYING APPARATUS

BACKGROUND OF THE INVENTION

1. Field of the invention

This invention relates to a thermal copying apparatus which makes an original and a plain sheet to be in intimate contact with each other and carries out thermosensitive copying operation by irradiating a light from an exposure source.

2. Description of the prior art

The thermal copying apparatus irradiates an original pressed onto a recording sheet by a light from an exposure source to generate a temperature pattern corresponding to an original image. Due to the temperature pattern, the original image is copied on the recording sheet.

One known example is structured such that a light source is disposed within a transparent tubular member and an original and a recording sheet are fed between the transparent tubular member and a pressure roller which is pressed onto the tubular member.

Another known example is structured such that an original and a recording sheet are pressurized between a flat glass plate and a platen each time they are conveyed by a predetermined distance, and the original is light-radiated through the glass plate.

Those structured as above, however, are disadvantageous in that if foreign matters such as dust in air are entered between the transparent member and the pressure roller or between the glass plate and the platen, then the quality of copying will be outstandingly degraded. Also, the apparatus with the mechanism for intermittently pressurizing the original and the recording sheet will become unavoidably complicated in structure. Further, in multicolor copying operation, the problem of color position deviation would arise from the reciprocal movement of the recording sheet required.

In addition, a temperature bias is caused at the original and the recording sheet due to the temperature of the transparent member, resulting in a change of copying density.

Further in addition, the transparent member will be cooled by the original or recording sheet which are fed, so that the temperature distribution on the surface thereof will be made not-uniform, which will cause an unevenness in copying density.

Still further, the temperature of the transparent member will be increased during copying operation and particularly when it is increased in excess the image copied will become fogged. Thus, the transparent member is required to be cooled. But if it is not uniformly cooled, an evenness in copying density will be caused.

SUMMARY OF THE INVENTION

An object of this invention is to provide a thermal copying apparatus capable of producing a uniform density of copy image.

Another object of this invention is to provide a thermal copying apparatus having the copying energy reduced.

A further object of this invention is to have the above mentioned apparatus realized by a simple structure.

A thermal copying apparatus in accordance with this invention comprises a holding member and a transparent member for holding therebetween an original and a recording sheet so that the original and the recording sheet are in intimate contact with each other, a heating means for heating the transparent member, a light source for producing a light for irradiating the original through the transparent member to perform an copying operation thermosensitively, and a conveying means for conveying the original and the recording sheet.

The light source produces the light to perform the copying operation each time when the original and the recording sheet are conveyed by a predetermined distance. The transparent member is heated by the heating means so that a reduction of copying density due to a fall of temperature of the transparent member at the side at which the original and the recording sheet are fed can be compensated.

Furthermore, the thermal copying apparatus in accordance with this invention is preferably equipped with a cooling means for cooling the transparent member. The cooling means generates cooling gas flowing in a direction perpendicular to the conveyed direction of the original and recording sheet, and periodically reverses the following direction of the gas so that the transparent member is cooled uniformly. In addition, the temperature of the transparent member would become a bias for the original and the recording sheet and if the copying operation is carried out using an energy at a same level, then the copying density would change depending on the temperature of the transparent member. To avoid this, the apparatus in accordance with this invention preferably has means which detects temperature of the transparent member and controls the flash energy of the light source.

By using the above mentioned structural elements independently or in combination, the cooling action of the transparent member due to the original or the recording sheet can be compensated. Also, the copying density can be made uniform by cooling the transparent member and/or controlling the flash energy of the light source in accordance with a change in temperature of the transparent member.

DESCRIPTION OF THE PREFERRED EMBODIMENT

Figure 1:
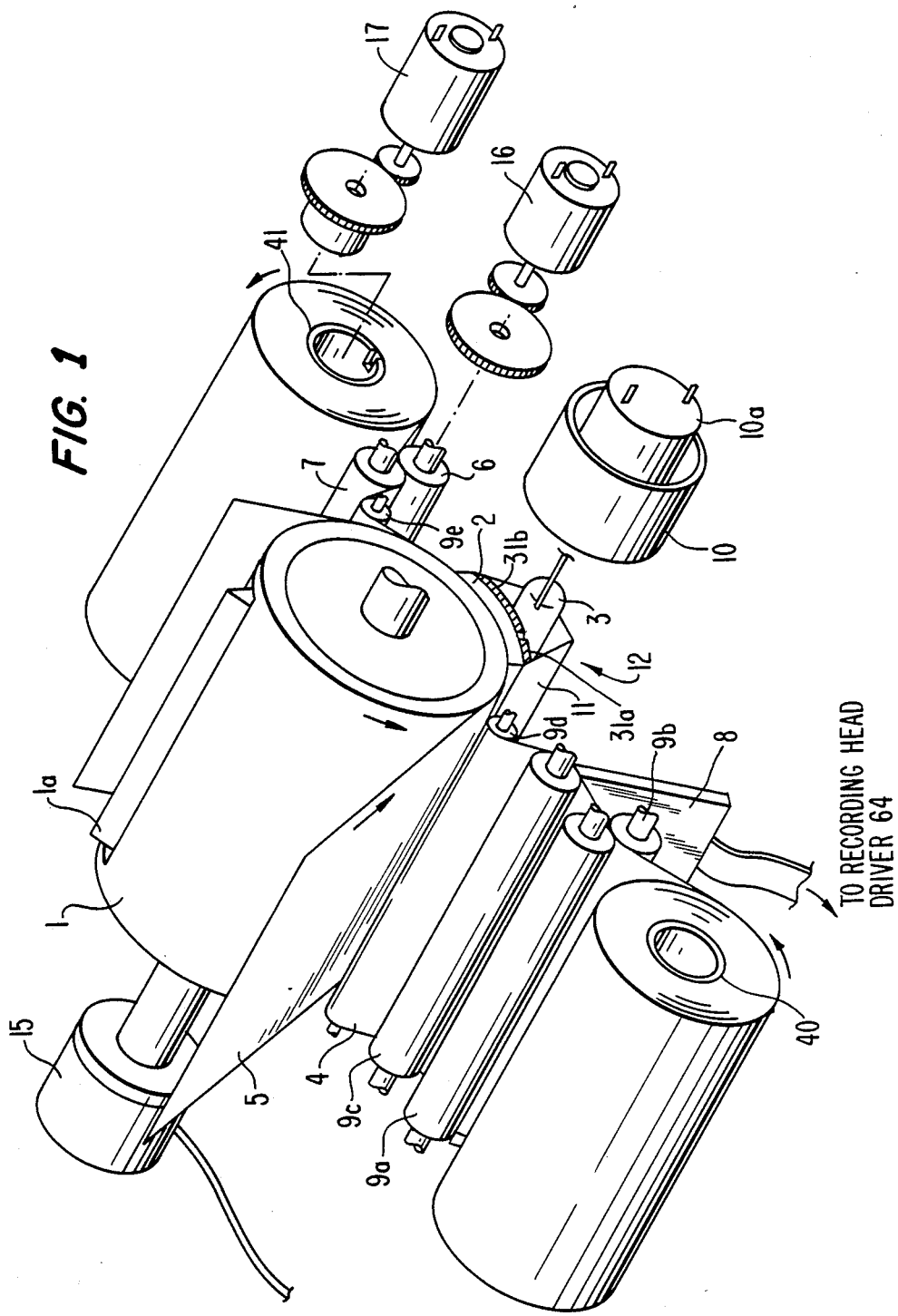
FIG. 1 is a perspective view showing a preferred embodiment of thermal copying apparatus in accordance with this invention.

Hereinafter, the embodiment of this invention will be described by referring to the drawings. In FIG. 1, a mask sheet 4 is supplied from a supplying reel 40 to be wound up on a winding reel 41 which is driven by a sheet motor 17. A recording sheet 5 is supplied, in the same manner as the mask sheet, via a supplying roller (not shown) from a supplying cassette (not shown) to be held by a pawl 1a of a drum 1. After completion of copying, the recording sheet is released from the drum via a releasing roller (not shown) because a peeling roller 9e peels off the mask sheet 4 and the pawl 1a is disengaged. The mask sheet 4 and the recording sheet 5 are supported by the drum 1 and intimately contacted each other by being pressed onto the drum 1 at a predetermined strength of force by a glass plate 2 having a predetermined curvature.

A rotary encoder 15 is disposed coaxially with the drum 1 for detecting a rotational angle of the drum. A xenon flash lamp 3 which serves to act as an exposure light source is disposed confrontedly adjacent to the glass plate 2 and a reflector 11 is disposed around the lamp 3.

Figure 2:
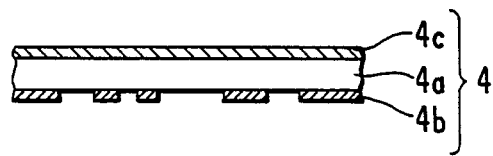
FIG. 2 is a sectional view showing a structure of a mask sheet.

The mask sheet 4, as shown in FIG. 2, comprises an aluminum layer 4b deposited on one surface of a transparent sheet 4a and a thermomelting ink 4c coated on the other surface of the transparent sheet 4a. A discharge recording head 8 has a plurality of recording needles (not shown) at the top end thereof. Signal voltages are applied to the needles through a recording head driver (shown later) in accordance with a pattern to be copied thereby removing the aluminum layer 4b of the mask sheet 4 to correspond to the pattern. The recording sheet 5 is placed on the mask sheet 4 on the surface on which the thermomelting ink 4c is coated.

A capstan 6 is driven by a capstan motor 16 to convey the mask sheet 4 cooperatively with a pinch roller 7. Roller 9a through 9e form a conveying route of the mask sheet 4, and particularly the roller 9b serves also as a return electrode for the discharge recording.

A cooling fan 10, which is driven by a fan motor 10a, is to cool the xenon flash lamp 3 and the glass plate 2.

The glass plate 2 and the reflector 11 define a wind path 12 for flowing the cooling air in the direction perpendicular to the direction that the recording sheet 5 and the mask sheet 4 are conveyed.

Figure 3:
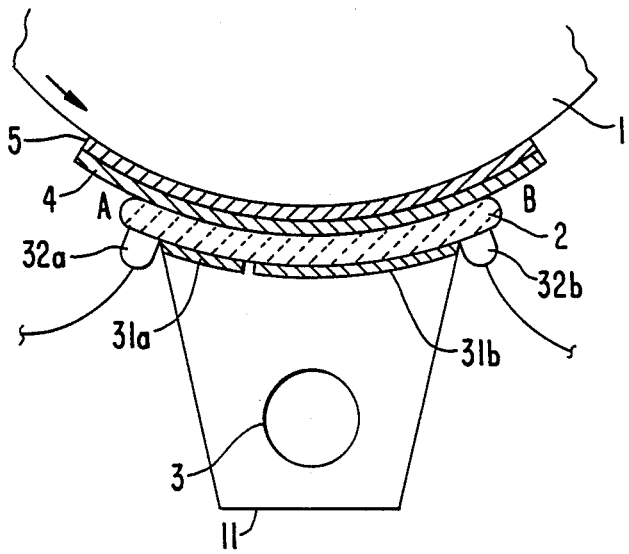
FIG. 3 is a sectional view showing a structure of a exposure section of the preferred embodiment shown in FIG. 1.
Figure 4A:
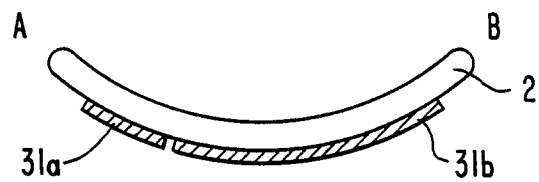
FIG. 4 is a front view and a plan view of a transparent heating element of the preferred embodiment shown in FIG. 1.
Figure 4B:
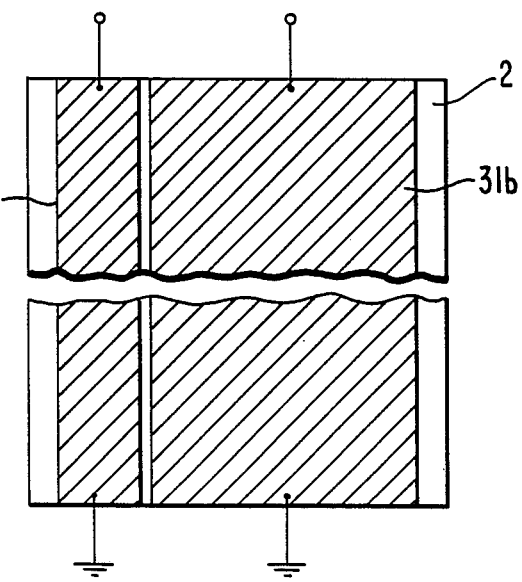

Referring to FIG. 3, transparent heating elements 31a and 31b of indium oxide ($In_2O_3$) for heating the glass plate 2 and temperature sensors 32a and 32b for detecting the temperature of the glass plate 2 are disposed on the lower surface of the glass plate 2. The transparent heating elements 31a and 31b are, as shown in FIG. 4, separately deposited on the lower surface of the glass plate 2 and connected to a heating control circuit (shown later) thereby to be controllable independently.

Figure 6:
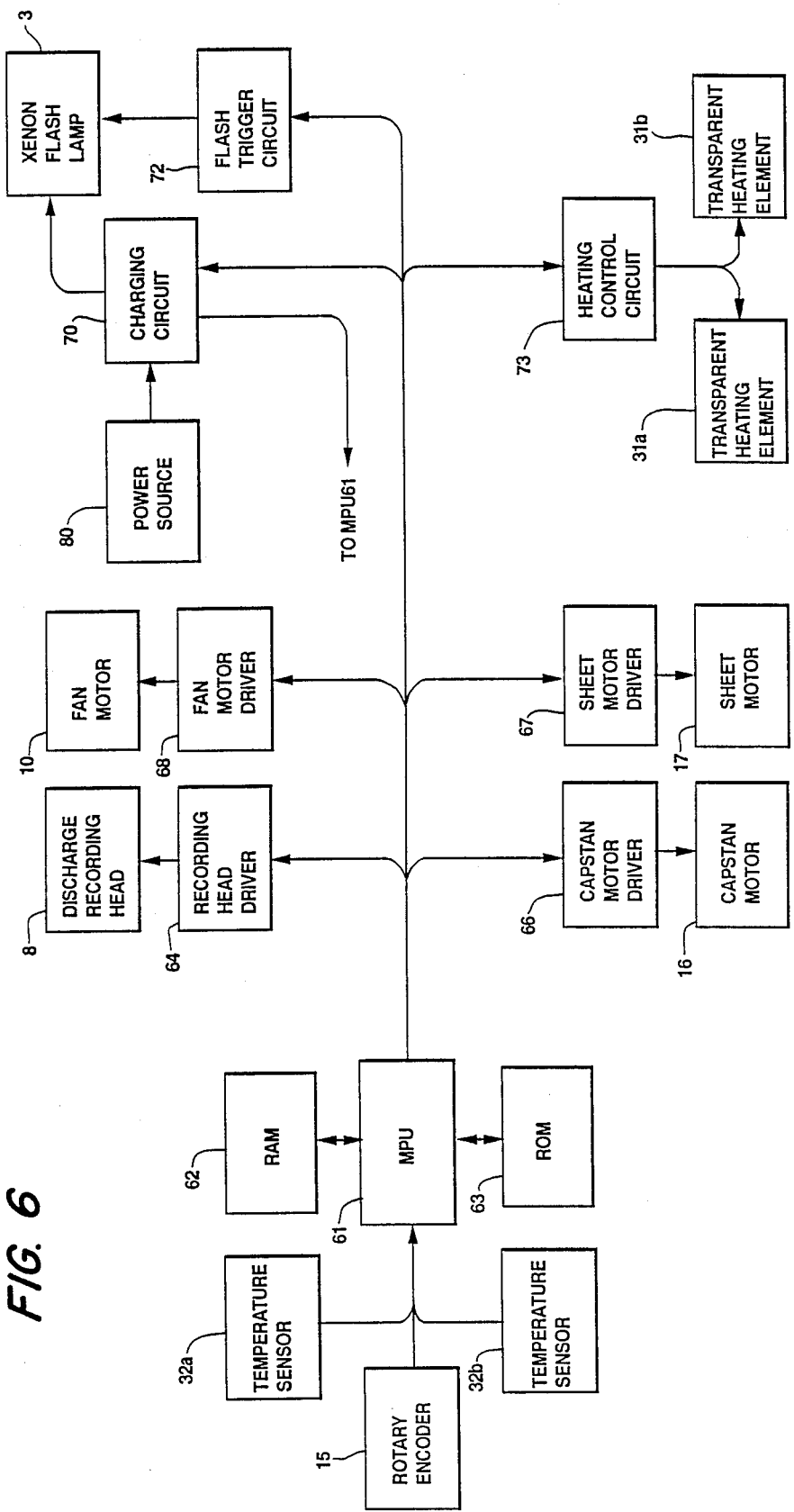
FIG. 6 is a block diagram showing a control circuit of the preferred embodiment shown in FIG. 1.

In FIG. 6, a block 61 is a microprocessor unit (MPU), a block 62 is a random-access memory (RAM), and a block 63 is a ready-only memory (ROM) The MPU 61 sends commands in accordance with a program stored in the ROM 63 based on data from the rotary encoder 15 and the temperature sensors 32a and 32b to the head driver 64, capstan motor driver 66, sheet motor driver 67, fan motor driver 68, charging circuit 70, flash trigger circuit 72 and heat control circuit 73.

The operation of the thermal copying apparatus structured as above will be shown below.

The mask sheet 4 is recorded with an image pattern by the discharge recording head 8, and the recording sheet 5 is conveyed to the pawl 1a of the drum 1 via the supplying roller to be held on the drum. When the Capstan motor 16 and the sheet motor 17 are driven, the mask sheet 4 is conveyed from the supplying reel 40 to the winding-up reel 41 while successively passing through the rollers 9a through 9e. The rotatable drum 1 rotates in synchronism with the conveyance of the mask sheet 4 while holding the recording sheet 5, so that the mask sheet 4 and the recording sheet 5 are successively intimately contacted each other at the predetermined strength of force between the drum 1 and the glass plate 2. If the xenon flash lamp 3 emits a light under such condition as above, the light transmits where the aluminum layer 4b has been removed but is reflected at where the layer 4b remains so that the thermomelting ink 4c accumulates heat and melts by receiving the light corresponding to the image pattern thereby to copy the image pattern on the recording sheet 5.

The recording sheet 5 is conveyed with the mask sheet 4 because the latter is conveyed continuously. The glass plate 2 is held in a fixed position and the mask sheet 4 is conveyed while sliding on the surface of the glass plate 2. The xenon flash lamp 3 flashes each time when the mask sheet 4 and the recording sheet 5 are conveyed by a predetermined distance. The flash is caused by a high voltage pulse which is generated by closing a trigger switch 721 of the flash trigger circuit 72 in response to a command from the MPU 61 under a condition that a capacitor 701 is charged. Timings to operate the discharge recording head 8 and the xenon flash lamp 3 are determined by the MPU 61 by counting pulses from the rotary encoder 15.

Figure 5:
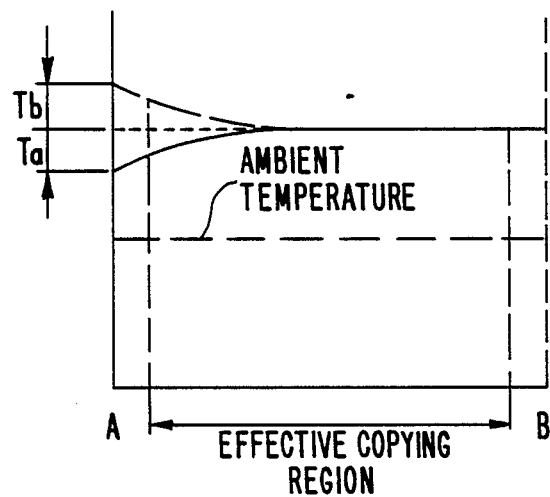
FIG. 5 shows a temperature characteristic of a surface of a glass plate cooled by the mask sheet.

If the copying operation is carried out as above, temperature of the glass plate 2 will become higher than ambient temperature due to the flash of the xenon flash lamp 3. However, as shown in FIG. 5, since the glass plate 2 is cooled by the mask sheet 4 which is lower in temperature, the portion where the mask sheet 4 is fed into (indicated at A) becomes lower in temperature by $T a$ than that of the portion where it is fed out (indicated at B). The mask sheet thus fed is warmed up to the temperature of the glass plate 2 during conveying, so that temperature differences will be produced where the copying is to be made. The temperature differences at the mask sheet will cause differences in heat quantities for heating the thermomelting ink 4c to its melting point, so that the copying operation using an energy at a same level causes the copying density to be varied.

In this embodiment, in order to reduce the copying energy at the beginning of the copying operation, the glass plate 2 is heated during a waiting state of the apparatus by applying an electric current to the transparent heat elements 31a and 31b. In this case, the transparent heat element 31a generates a larger amount of heat than the element 31b so that the portion indicated at A is held at a temperature higher by $T b$ ($Tb \approx Ta$) than that of the portion indicated at B of the glass plate 2. When the copying operation is started, a larger electric current is applied to the transparent heat element 31a than during waiting. If the temperature of the glass plate 2 is being uniformalized during waiting, the A-portion of the plate 2 will be cooled by the mask sheet 4 immediately after the beginning of the copying operation and a time until the temperature of that portion of the glass plate 2 elevates after the application of larger electric current to the element 31a will be delayed. However, this can be solved by making the A-portion of the glass plates 2 higher in temperature by $T b$ than the B-portion during waiting as described above.

Temperatures of the glass plate 2 are detected by the temperature sensors 32a and 32b. According to the detected temperatures, the electric currents applied to the transparent heat elements 31a and 31b are controlled by the heat control circuit 73. Currents to be applied to the transparent heat elements 31a and 31b in accordance with the temperatures detected by the temperature sensors 32a and 31b are determined by data stored in the ROM 63.

As described above, the preheating of the glass plate 2 makes it possible to apply a temperature bias to the mask sheet 4 thereby to reduce the copying energy just after the beginning of copying operation as well as to compensate the cooling action of the glass plate 2 due to the mask sheet 4 or the recording sheet 5. Further, it is possible to make the power unit and apparatus small-sized as well as to render the copying density remarkably uniform.

In the embodiment shown above, the transparent heat element is divided into two parts, 31a and 31b, and a current applied to each of them is controlled to produce a temperature gradient between two portions, A and B, of the glass plate 2.

Figure 7:
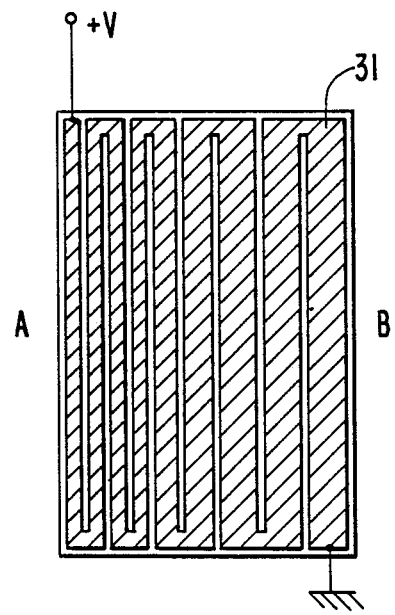
FIG. 7 is a front view showing another example of transparent heating element.

But is also possible to provide a transparent heat element having slits which are different in interval between the two portions, A and B, as shown in FIG. 7 to vary a current density for applying thereto thereby to produce a temperature gradient therebetween. Also, if an energy necessary to do copying immediately after the beginning of the operation is well supplied, there is no need to apply an electric current to the transparent heat element 31b during waiting.

If the temperature of the glass plate 2 is elevated up to near the melting point of the thermomelting ink 4c due to the flash of the xenon flash lamp 3, the ink coated in areas other than the image pattern recorded on the aluminum layer 4b would be copied on the recording sheet 5. This leads to an outstanding deterioration in copying quality. Thus, the necessity of cooling the glass plate 2 is arised. In this embodiment, the glass plate 2 and the reflector 11 are disposed so as to provide a kind of duct so that a cooling air can be supplied to effectively cool the glass plate 2 during passing through the duct. In this case, however, the supply of the cooling air only in one direction may cause the cooling action not to be uniform, because the area near the inlet of the air is more effectively cooled than the area near the outlet thereof. As the result, the copying density will become lower at the inlet area than at the outlet area. With different temperatures of the mask sheet 4, the amount of heat necessary to heat the thermomelting ink 4c to its melting point varies, so that the copying operation at the same level of energy results in not-uniform copying density.

Thus, this embodiment is structured such that the cooling fan 10 is reversed in rotating direction by the fan motor driver 68 at predetermined cycles to periodically reverse the flowing direction of the cooling air. The reversing interval depends on the heat capacity of the glass plate 2 and is preferably set within a range from 6 to 12 seconds. With this structure, the glass plate 2 can be cooled uniformly from its both sides to obtain uniform temperature distribution and copying density.

Instead of the use of one cooling fan to be periodically reversed, two cooling fans may be disposed at both sides of the wind path(duct) and operated alternately at predetermined intervals to supply the cooling air alternately in opposite directions.

Figure 8:
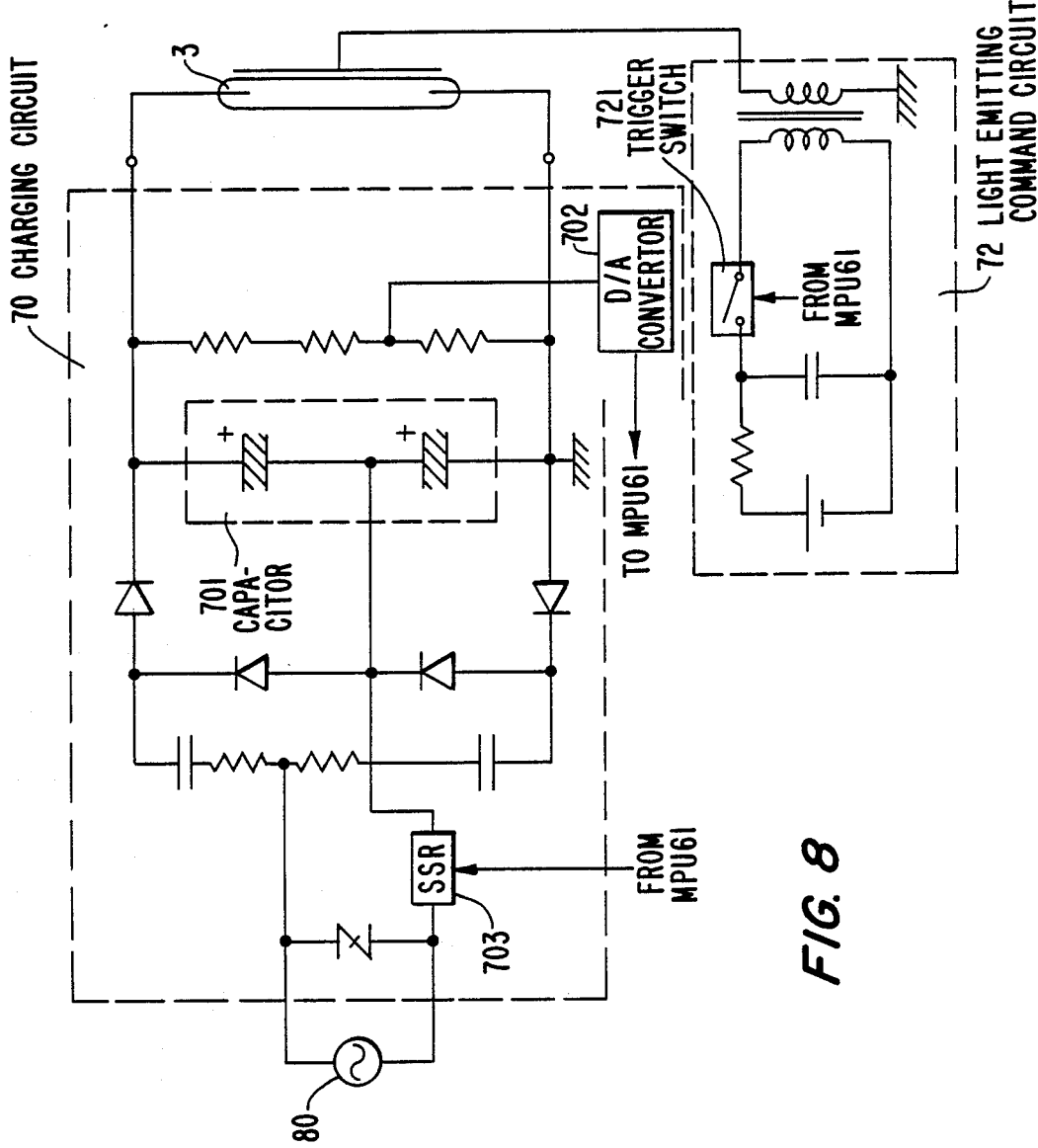
FIG. 8 shows a charging circuit and a flash trigger circuit in the control circuit shown in FIG. 6.

The charging circuit 70, as shown in FIG. 8, boosts and rectifies an alternate current from an AC power source 80 to charge the capacitor 701. The charging operation completes when data from a D/A converter 701 indicates that the capacitor 701 has been charged up to a charging voltage which is determined from temperature data detected by at least one of the temperature sensors 32a and 32b. The control of the charging voltage is carried out by switching a solid state relay (SSR)703 in response to a signal from the MPU 61. The xenon flash lamp 3 flashes in response to a trigger signal from the flash trigger circuit 72 after the capacitor 701 has been charged up to a predetermined voltage. By controlling the flash energy as described above, the copying operation is always carried out under the optimum energy condition to obtain a uniform copying density.

In this embodiment, the mask sheet 4 is structured as shown in FIG. 2, but it may also be possible to use an ordinary paper as the mask sheet and a thermosensitive paper as the recording sheet. In addition, the mask sheet 4 and the recording sheet 5 are intimately contacted each other between the drum 1 and the glass plate 2, but if they are structured such as to be conveyable in intimately contacting each other, a flat holding member and a flat transparent member may be used. Further in addition, any transparent material other than glass can be used in lieu of the glass plate 2. Still further in addition, temperature sensors are disposed one on each of A- and B-portions of the glass plate 2, but only one element may be disposed at a position where the typical temperature of the glass plate can be detected.

What is claimed is:

1. A thermal copying apparatus comprising:
   a holding member and a transparent member for holding therebetween an original having thereon an image pattern corresponding to which heat is accumulated when said original is irradiated by a light and a recording sheet so that said original and said recording sheet are in intimate contact with each other at a predetermined area;
   a conveying means for conveying said original and said recording sheet;
   a light source for producing a light for irradiating said original through said transparent member each time when said original and said recording sheet are conveyed by a predetermined distance to effect a copying operation in which said original accumulates heat in a pattern corresponding to said image pattern so that said image pattern is thermosensitively copied on said recording sheet; and
   a temperature control means for making a surface temperature of said transparent member uniform during the copying operation by at least one of heating and cooling.

2. A thermal copying apparatus as set forth in claim 1, wherein said temperature control means comprises a heating means for preheating said transparent member at least at a portion thereof where said original and said recording sheet are fed thereinto prior to the copying operation.

3. A thermal copying apparatus as set forth in claim 2, wherein said heating means heats all of said transparent member prior to the copying operation in such a way that the portion wherein said original and said recording sheet are fed into is higher in temperature than a portion where they are fed out so as to thereby produce a temperature gradient between the two portions.

4. A thermal copying apparatus as set forth in claim 2, wherein said temperature control means further comprises:

a temperature sensing means for detecting the temperature of said transparent member; and a heat controlling means for controlling an amount of heat generated by said heating means in accordance with the temperature detected by said temperature sensing means.

5. A thermal copying apparatus as set forth in claim 2, wherein said heating means heats the portion where said original and said recording sheet are fed more into than a portion where they are fed out during the copying operation.

6. A thermal copying apparatus as set forth in claim 2, wherein said heating means comprise a transparent heating element which is disposed on said transparent member.

7. A thermal copying apparatus set forth in claim 6, wherein said heating element is divided into a plurality of parts to produce a temperature gradient within said transparent member.

8. A thermal copying apparatus as set forth in claim 2, wherein said temperature control means further comprises:

a cooling means for generating a periodically reversing flow of cooling gas to cool said transparent member; and a wind path for causing said cooling gas to flow in opposite directions perpendicular to a direction in which said original and said recording sheet are conveyed.

9. A thermal copying apparatus as set forth in claim 2, wherein said temperature control means further comprises:

a temperature sensing means for detecting the temperature of said transparent member; and a light energy control means for controlling light energy of said light source in accordance with the temperature of said transparent member detected by said temperature sensing means.

10. A thermal copying apparatus as set forth in claim 1, wherein said temperature control means comprises:

a cooling means for generating a periodically reversing flow of cooling gas to cool said transparent member; and a wind path for causing said cooling gas to flow in opposite directions perpendicular to a direction in which said original and said recording sheet are conveyed.

11. A thermal copying apparatus as set forth in claim 10, wherein said cooling means comprises a single cooling fan which periodically reverses its rotating direction to generate a periodically reversing flow of cooling air.

12. A thermal copying apparatus as set forth in claim 10, a wherein said cooling means reverses at intervals of time ranging from six to twelve seconds.

13. A thermal copying apparatus as set forth in claim 10, wherein said temperature control means further comprises:

a temperature sensing means for detecting the temperature of said transparent member; and a light energy control means for controlling light energy of said light source in accordance with the temperature of said transparent member detected by said temperature sensing means.

14. A thermal copying apparatus as set forth in claim 1, wherein said temperature control means comprises:

temperature sensing means for detecting the temperature of said transparent; member; and a light energy control means for controlling light energy of said light source in accordance with the temperature of said transparent member detected by said temperature sensing means.

15. A thermal copying apparatus as set forth in claim 14, wherein said light source comprises an electronic flash tube, and said light energy control means comprises:

a capacitor for storing energy to be applied to said electronic flash tube; and a charging control means for controlling the energy stored in the capacitor in accordance with the temperature detected by said temperature sensing means.

* * * * *